United States Patent [19]
Gruber

[11] Patent Number: 5,992,779
[45] Date of Patent: Nov. 30, 1999

[54] FISHING REEL WITH LOCKABLE BAIL SYSTEM

[75] Inventor: Gerhard Gruber, Meinheim, Germany

[73] Assignee: D.A.M. Deutsche Angelgeräte Manufaktur Hellmuth Kuntze GmbH & Co. KG, Gunzenhausen, Germany

[21] Appl. No.: 08/665,891

[22] Filed: Jun. 19, 1996

[30] Foreign Application Priority Data

Jun. 23, 1995 [DE] Germany .......................... 195 22 835

[51] Int. Cl.⁶ .................................................. A01K 89/01
[52] U.S. Cl. .......................................................... 242/231
[58] Field of Search ................................... 242/230, 231, 242/232, 233, 247, 248

[56] References Cited

U.S. PATENT DOCUMENTS

| | | | |
|---|---|---|---|
| 4,848,695 | 7/1989 | Kaneko | 242/232 |
| 4,921,187 | 5/1990 | Yamaguchi et al. | 242/232 |
| 5,524,832 | 6/1996 | Sakaguchi | 242/233 |

FOREIGN PATENT DOCUMENTS

| | | | |
|---|---|---|---|
| 467812 | 1/1992 | European Pat. Off. | 242/232 |
| 4209400 | 9/1992 | Germany | 242/231 |

*Primary Examiner*—Donald P. Walsh
*Assistant Examiner*—Emmanuel M. Marcelo
*Attorney, Agent, or Firm*—Friedrich Kueffner

[57] ABSTRACT

A fishing reel includes a spool which receives a fishing line and is rotatable relative to the fishing reel. The fishing reel further includes a rotor which is rotatable relative to the fishing reel and the spool, wherein a bail system is hinged to the rotor, and wherein this bail system can be swung relative to the rotor between a reeling position and a casting position. A locking member which can be manually moved between a locking position and a releasing position is provided between the bail system and the rotor, wherein, in the locking position, the locking member locks the bail system in its casting position at the rotor and prevents it from swinging into the reeling position.

10 Claims, 5 Drawing Sheets

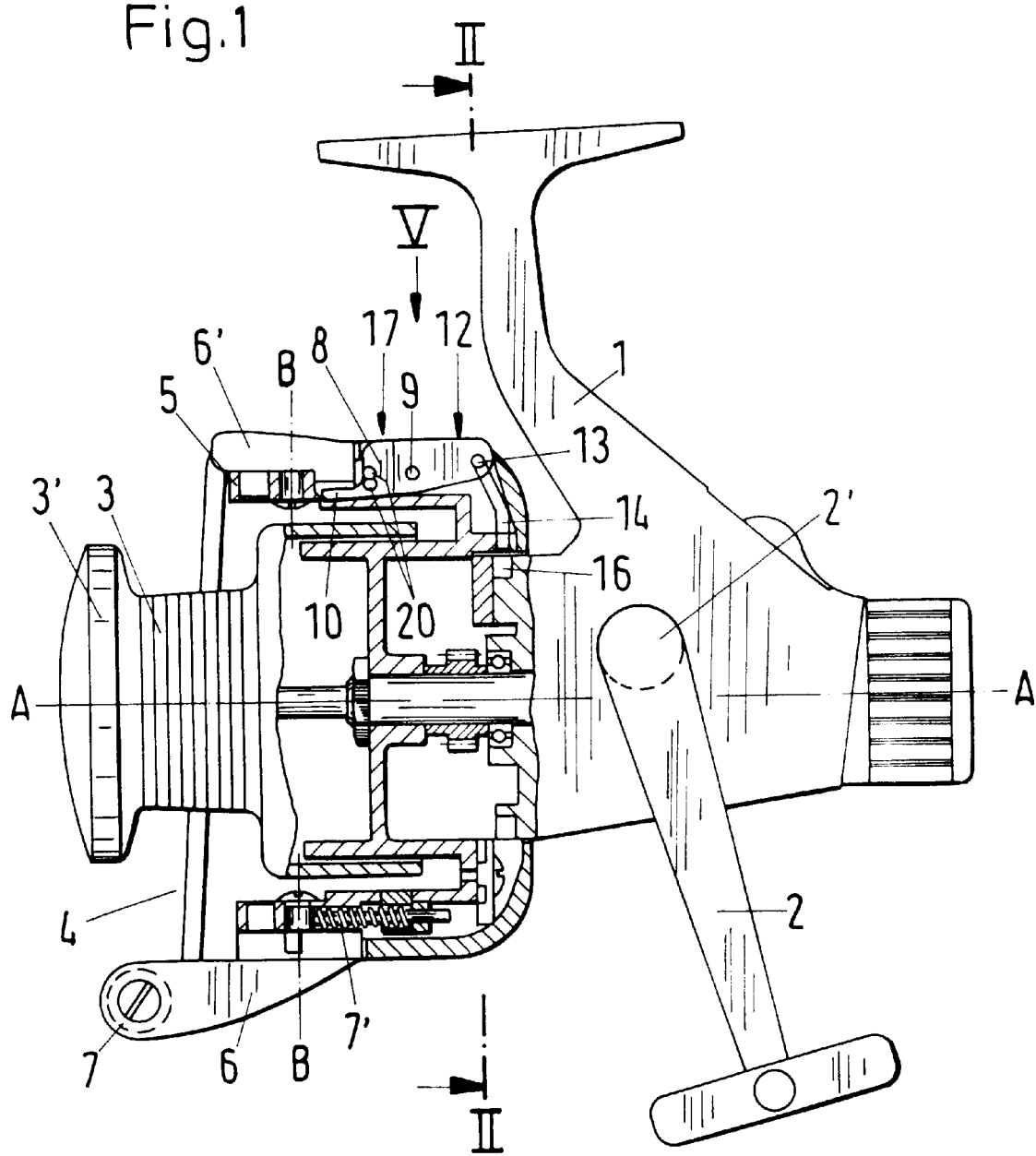

FISHING REEL WITH LOCKABLE BAIL SYSTEM

BACKGROUND OF THE INVENTION

1. Field of the Invention

The present invention relates to a fishing reel with a spool which receives the fishing line and is rotatable relative to the fishing reel. The fishing reel further includes a rotor which is rotatable relative to the fishing reel and the spool, wherein a bail system is hinged to the rotor, and wherein this bail system can be swung relative to the rotor between a reeling position and a casting position and means are provided for holding the bail system in the casting position.

2. Description of the Related Art

The casting position, also called line releasing position, is to be assumed by the bail system when the fisherman casts out. In this casting position, the bail system must be folded back, so that it does not obstruct the fishing line which is wound from the spool during casting. When the spoon is reeled in by rotating the crank handle of the fishing reel, the rotary motion of the rotor automatically ensures by means of stops or the like that the bail system is moved into the reeling position which is also called the line catching position. In that position, the fishing line travels over the line roller mounted on the arm.

In fishing reels, as disclosed, for example, in DE-OS 32 18 796, there is the disadvantage that for several reasons it is possible that the bail system is prematurely swung from the casting it ion into the reeling position. Thus, when casting very strongly, the rotor may turn and, consequently, may unintentionally actuate the release for swinging the bail system into the reeling position. This may also occur when the fisherman does not pay attention and the crank handle of the fishing reel is moved. An unintentional swinging of the bail system from the casting position into the reeling position frequently also occurs when the fisherman inadvertently touches the bail system with his hand and swings the bail system into the reeling position. Since only very small forces are required for swinging the bail system, this may occur even when the bail system is touched only lightly. The fisherman then has to reel in the spoon once again, the bail system has to be returned into the casting position and the spoon is cast out once again.

A fishing reel disclosed in DE-OS 40 21 425 has the disadvantage that the bail system must be moved from the closed reeling position for winding up the fishing line into the open released position, i.e., the casting position, by actuating a lever, herein the actuating lever must be held in this position with the finger of the person operating the fishing reel during the entire casting procedure. The fisherman can remove the finger from the actuating lever only after casting is finished. This means that the casting procedure is made difficult for the fisherman because during the casting process the fisherman has to firmly grasp the fishing rod with both hands. However, this is not possible when the finger of one hand is needed for carrying out the actuation described above. Moreover, there is the disadvantage that the construction of the bail system in the casting position is relatively complicated and, thus expensive to manufacture.

EP 0 467 812 discloses a fishing reel in which the bail system is held in the casting position and the reeling position by means of a compression spring, wherein this spring support travels through a dead center position when changing over from the casting position to the reeling position and vice versa. The casting position can be secured by means of a locking lever. This means that the bail system is secured against an unintentional swinging into the reeling position when the crank handle of the fishing reel is unintentionally rotated. However, the bail system in not secured against moving from the casting position into the reeling position when being touched by the fisherman, or when a very quick and very forceful casting of the bait produces such a force that the bail system is moved into the reeling position.

SUMMARY OF THE INVENTION

Therefore, it is the primary object of the present invention to provide a fishing reel as described above in which any undesired and, thus, premature swinging of the bail system from the casting position into the reeling position is prevented with certainty. When casting the bait with the line, the fisherman should be able to concentrate on casting and should be able to fully use both hands for casting.

In accordance with the present invention, a locking member which can be manually moved between a locking position and a releasing position is provided between the bail system and the rotor, wherein, in the locking position, the locking member locks the bail system in its casting position at the rotor and prevents it from swinging into the reeling position.

The locking member which must be moved manually between the locking position and the releasing position makes it possible to lock the bail system in the casting position relative to the rotor, so that none of the possibilities described above in connection with the related art can cause the bail system to be moved unintentionally and, thus, prematurely into the reeling position. This means that the fisherman can carry out the casting procedure with confidence, because he is able to fully concentrate on the casting procedure. In particular, the fisherman has both hands fully available for grasping the fishing rod for casting the bait. When the casting procedure is concluded and the fisherman wants to reel in the line once again, it is sufficient to release the locking member manually.

When the bail system is in the casting position and the bail system is locked, it may occur under some circumstances that the fisherman overlooks this and attempts to actuate the crank handle of the fishing reel. If this is done in a clumsy manner and with the application of too much force, the swinging mechanism may be damaged. In order to avoid this, a further development of the present invention provides that an additional locking means is provided to prevent a rotation of the rotor relative to the fishing reel in order to lock the bail system in the casting position.

In accordance with another preferred embodiment of the present invention, the locking member between the bail system and the rotor is coupled to the locking means for preventing the rotation of the rotor relative to the fishing reel. This can be achieved by structurally very simple means. For example, the locking member and the locking means can be constructed in such a way that, in the locking position of the locking member of the bail system, the locking means is in engagement with a recess of the fishing real. The fishing reel may also have several recesses and these recesses are preferably arranged in a circular pattern in the area of the fishing reel adjacent the rotor. Consequently, the fisherman only has to carry out a single manipulation, i.e., moving the locking member into the locking position or into the releasing position.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a side view, partially in section, of a fishing reel according to the present invention, wherein the locking member is in the releasing position and the bail system is in the reeling position;

DESCRIPTION OF THE PREFERRED EMBODIMENT

Figure 2:
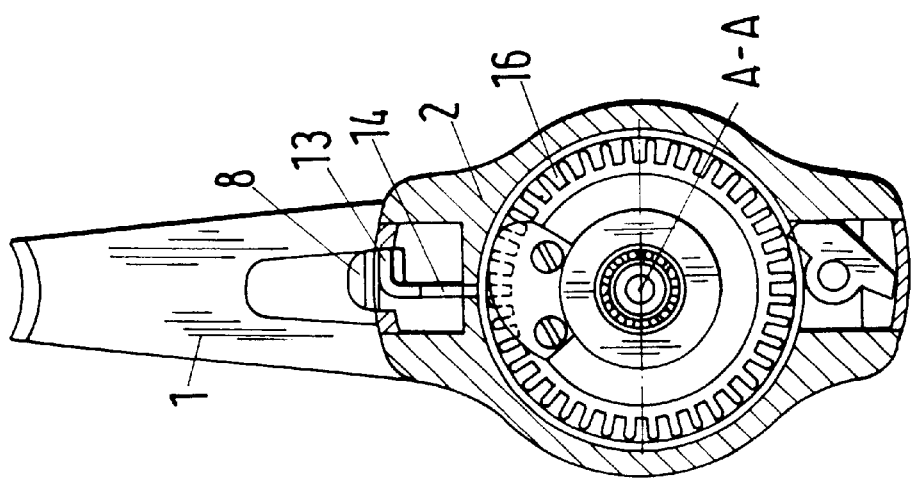
FIG. 2 is a sectional view taken along Sectional line II—II and FIG. 1.

As shown in the drawing, the fishing reel 1 includes a rotor 5 which is rotatable relative to the fishing reel 1. The rotary motion of the rotor 5 is produced by a crank handle 2 which can be turned about the axis 2' relative to the fishing reel 1. The rotor 5 rotates relative to the fishing reel 1 and relative to a spool 3' receiving the fishing line 3 about the longitudinal axis A—A of fishing reel 1. In addition, the spool 3' is rotatable relative to the fishing reel 1 about the axis A—A.

A bail system 4 with a respective bail-wire, can be swung between two positions relative to the rotor 5 about the axis B—B. The first position is the reeling position shown in FIG. 5 in which a line roller 7 which is mounted on a bailarm 6 of the bail system 4 guides the fishing line. The second position is the casting position shown in FIG. 3 into which the bail system 4 is swung from the reeling position together with the bailarm 6 supporting the bail system 4 and with the bailholder 6' which supports the other end of the bail system 4; in the casting position, the bail system 4 and the line roller 7 do not obstruct the running fishing line 3 during casting.

Figure 1A:
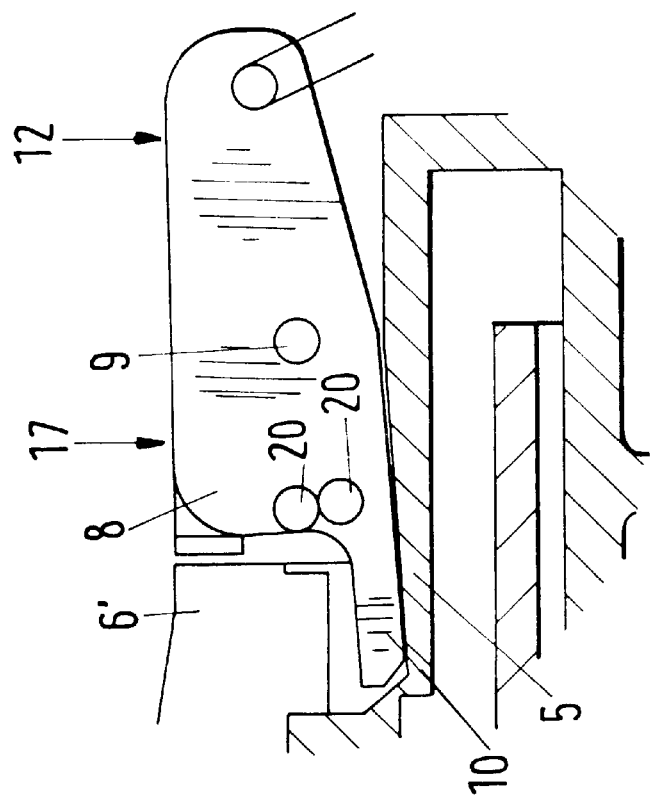
FIG. 1a is a partial side view, on a larger scale, showing a detail of FIG. 1.
Figure 5:
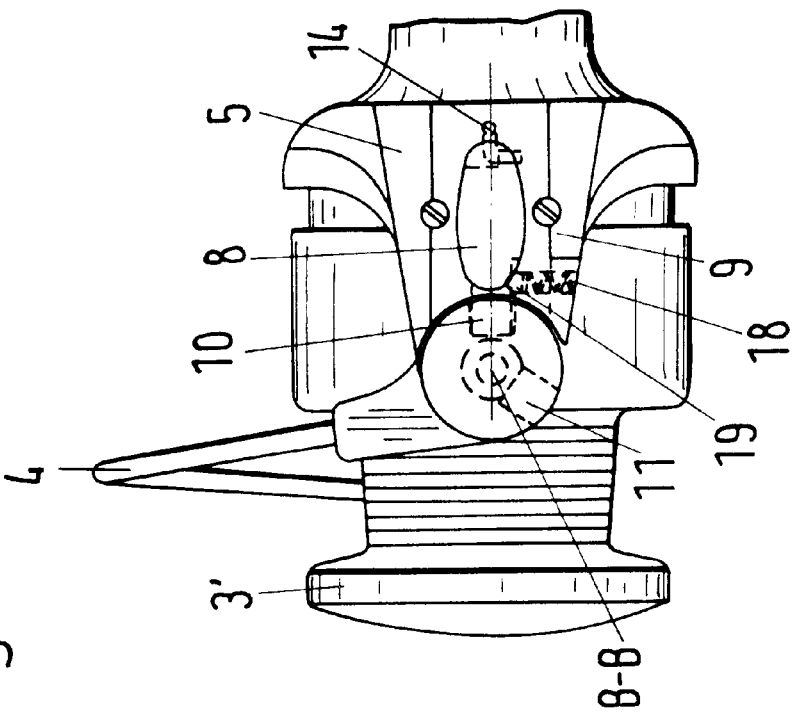
FIG. 5 is a partial view, on a larger scale, showing the locking member in the direction of arrow V in FIG. 1.

The fishing reel 1 further includes a locking member 8. In the preferred embodiment of the invention shown in the drawing, the locking member is a rocker 8 which can be swung manually about its joint axis 9 at the rotor into the locking position shown in FIG. 3 or into the unlocked position or releasing position on in FIG. 1. For this purpose, the rocker 8 has a locking cam 10 which fits into a recess 11 of the bailholder 6' of the bail system 4 once the rocker 8 has been moved into the position Down in FIG. 3. Accordingly, FIGS. 1, 1a and 5 show that, when the rocker 8 is released and the bail system 4 is in the reeling position shown in FIGS. 1 and 5, the recess 11 is not located above the locking cam 10, but rather assumes together with the bailholder 6' the position shown in FIG. 5.

Figure 3:
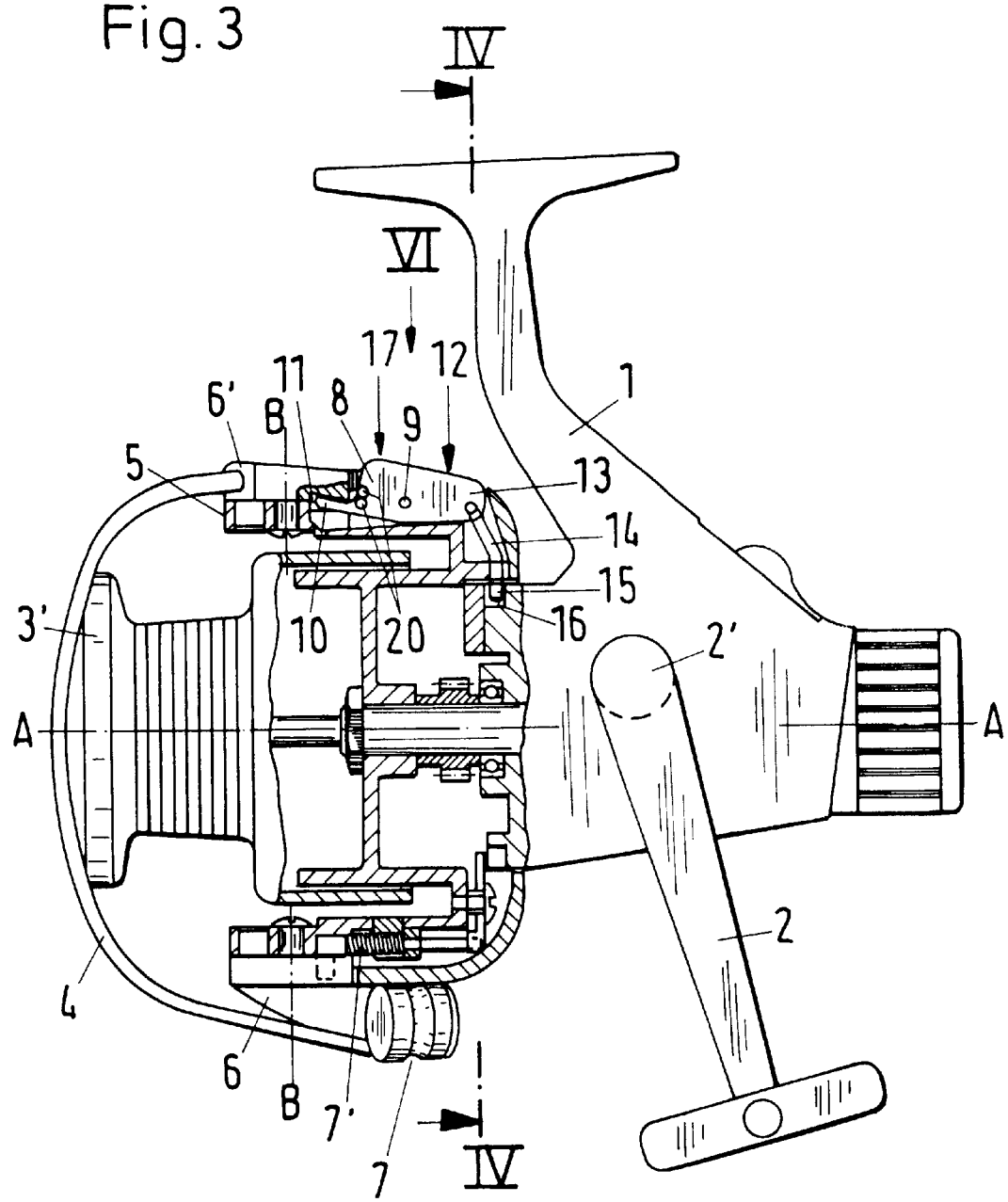
FIG. 3 is a side view corresponding to FIG. 1, wherein the locking member is in the locking position and the bail system is in the casting position.
Figure 3A:
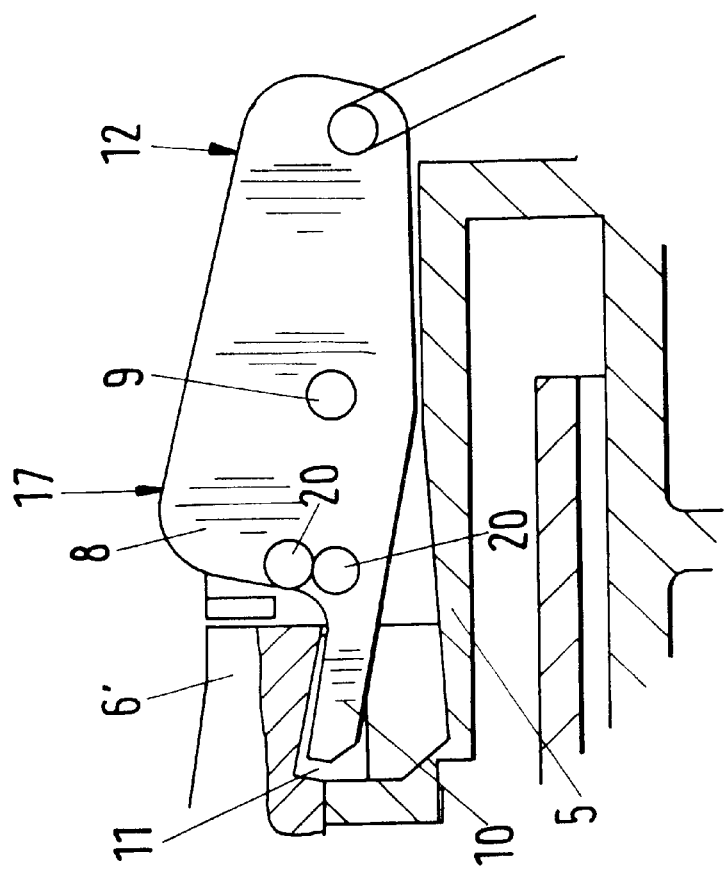
FIG. 3a is a side view corresponding to FIG. 1a showing the locking member in the locking position.
Figure 6:
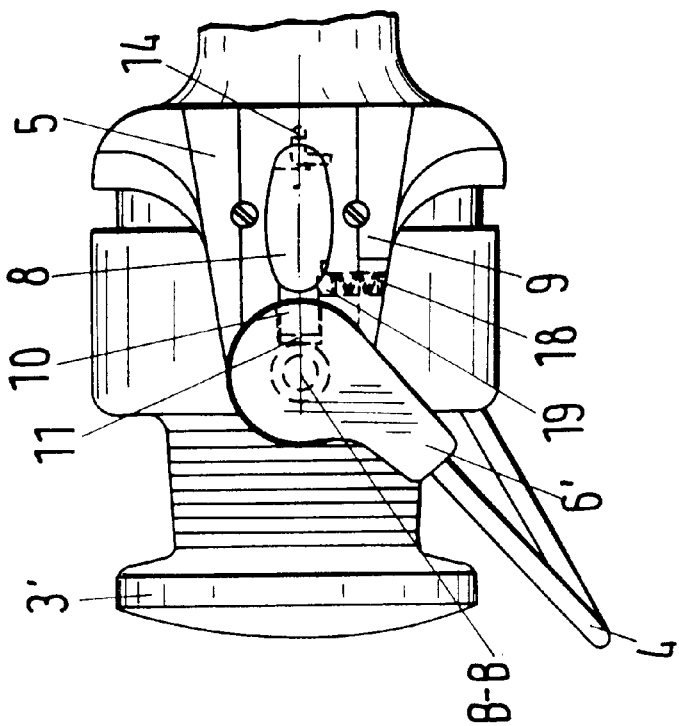
FIG. 6 is a partial view, on a larger scale, showing the locking member in the direction of arrow VI in FIG. 3.

On the other hand, FIGS. 3, 3a, and 6 show the aforementioned components in the casting position. The corresponding locked position of the bail system 4 is shown in FIGS. 3 and 6. FIGS. 3, 3a, and 6 further show that in this position the locking cam is located between two walls of the recess 11, so that the bail system 4 is prevented from swinging about the axis B—B from the position shown in FIG. 3 into the position shown in FIG. 1. This locking position is reached by applying pressure with a finger in the direction of arrow 12 against the portion of the rocker B located in FIG. 3 to the right of axis 9. Hinged to this portion at 13 is also a locking bar 14 which, in this locked position of the rocker 8, engages with its and 15 in a recess 16 of the fishing reel. The locking bar 14 as well as the rocker 8 rotate together with the rotor 5. In this locking position, the rotor 5 can no longer be rotated about the fishing reel 1 by actuating the crank handle 2.

Figure 4:
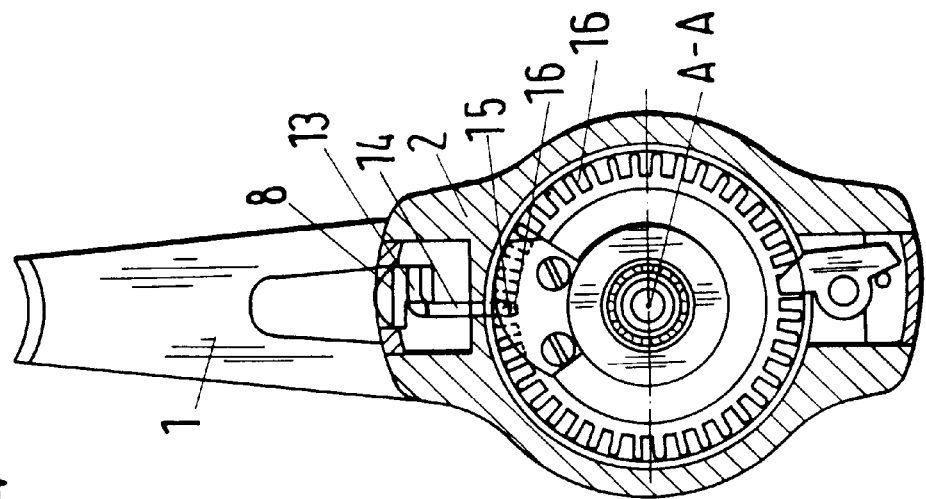
FIG. 4 is a sectional view taken along sectional line IV—IV in FIG. 3.

For this purpose, the fishing reel 1 is preferably provided with a larger number of recesses 16, as shown in FIGS. 2 and 4, wherein these recesses 16 are arranged in a circle about the longitudinal axis A—A. Consequently, moving the locking cam 10 into the recess 11 and moving the locking bar 14 into one of the recesses 16 takes place synchronously by carrying Out a single manipulation in the direction of arrow 12 of the corresponding portion of the rocker 8 located to the right of axis 9.

The unlocked position shown in FIG. 1 can be reached by simply preening with a finger in the direction of arrow 17 onto the portion of the rocker 8 forming the locking member on the left of the axis 9 as seen in FIGS. 1 and 3. The locking cam 10 is then located outside of the recess 11 and the locking bar 14, 15 is pulled out of the respective recess 16. Consequently, when rotating the crank handle 2, the bail system 4 can be moved into the reeling position by means of any device known from the prior art, for example, a rod 7' surrounded by a spring and the line can be wound up in this manner. As soon as the locking cam 10 is located in a position outside of the recess 11 of the bailholder 6' by pressing a finger in the direction of arrow 17, the bail system 4 can also be swung manually into the reeling position, as shown in FIGS. 1 and 5.

FIG. 5 shows a spring-biased releasable support for the rocker 8 forming the locking member in the two positions thereof as shown in FIGS. 1 and 3. A spring 18 presses a ball 19 or an appropriate pin into one of the two indentations 20 provided in the side wall of the rocker 8, as shown in FIGS. 1 and 3. In the locking position of FIG. 3, the ball 19 or the pin engages in the lower of the two indentations 20 as seen in FIG. 3a and, in the released position of FIG. 1, the ball 19 or pin engages in the upper indentation 20.

While specific embodiments of the invention have been shown and described in detail to illustrate the inventive principles, it will be understood that the invention may be embodied otherwise without departing from such principles.

I claim:

1. A fishing reel comprising a spool for receiving a fishing line, the spool being rotatable relative to the fishing reel, a rotor being mounted so as to be rotatable relative to the fishing reel and to the spool, a bail system being hinged to the rotor so as to be moveable between a reeling position and a casting position, further comprising a locking member mounted between the bail system and the rotor, the locking member being configured to be manually operated and mounted so as to be moveable between a locking position and a releasing position, wherein, in the locking position, the locking member securely locks the bail system on the rotor in the casting position so as to prevent the bail system from swinging into the reeling position, further comprising an additional locking means for preventing rotation of the rotor relative to the fishing reel.

2. The fishing reel according to claim 1, wherein the locking member between the bail system and the rotor is coupled to the additional locking means for preventing rotation of the rotor relative to the fishing reel, the fishing reel having a recess, wherein the locking member and the additional locking means are configured such that, in the locking position of the locking member, the additional locking means is in engagement with the recess of the fishing reel.

3. The fishing reel according to claim 2, wherein the fishing reel has a plurality of recesses for engagement by the locking means.

4. The fishing reel according to claim 3, wherein the plurality of recesses are arranged in a circular configuration in an area adjacent the rotor.

5. The fishing reel according to claim 1, wherein the locking member is a rocker member moveable between two positions, further comprising a releasable means for securing the rocker member in its two positions.

6. The fishing reel according to claim 5, wherein the releasable securing means comprises a ball biased by a spring and indentations for receiving the ball.

7. The fishing reel according to claim 5, wherein the releasable securing means comprises a pin biased by a spring and indentations for receiving the pin.

8. The fishing reel according to claim 5, comprising a rod hinged to the rocker member for locking the rocker member.

9. The fishing reel according to claim 8, wherein the rocker member is fastened to the rotor so as to be swingable about an axis, the rocker member forming two lever arms, wherein one of the lever arms comprises a locking cam of the locking member and another of the lever arms supports a hinge connection of the rod to the rocker member.

10. The fishing reel according to claim 1, wherein the locking member comprises a locking cam, the bail-system having an abutment, the abutment having a recess, wherein the recess of the abutment receives the locking cam in the locking position.

* * * * *